March 12, 1940.  E. THYS  2,193,354
VINE GRASPER BAR
Filed Sept. 27, 1938   2 Sheets-Sheet 1

INVENTOR.
Edouard Thys.
BY
Chas. E. Townsend.
ATTORNEY.

March 12, 1940.                    E. THYS                    2,193,354
VINE GRASPER BAR
Filed Sept. 27, 1938            2 Sheets-Sheet 2
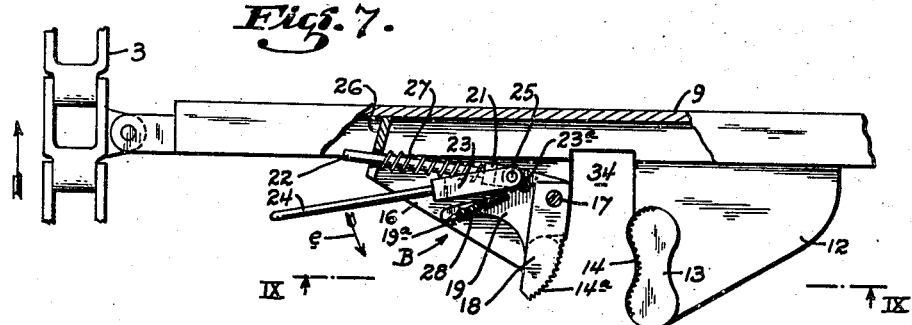
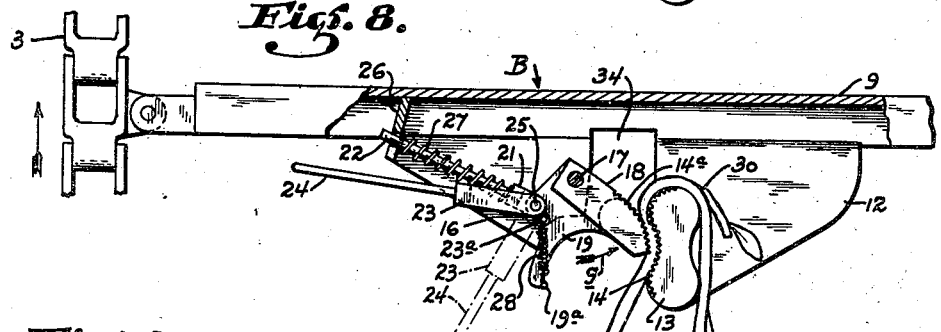
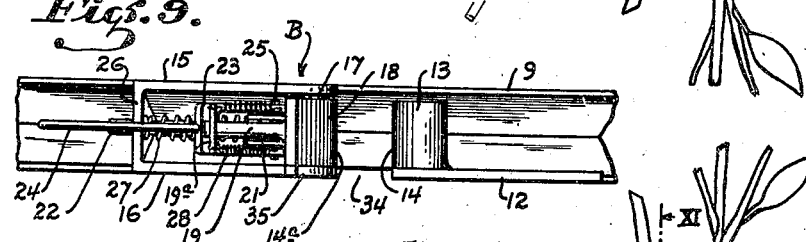
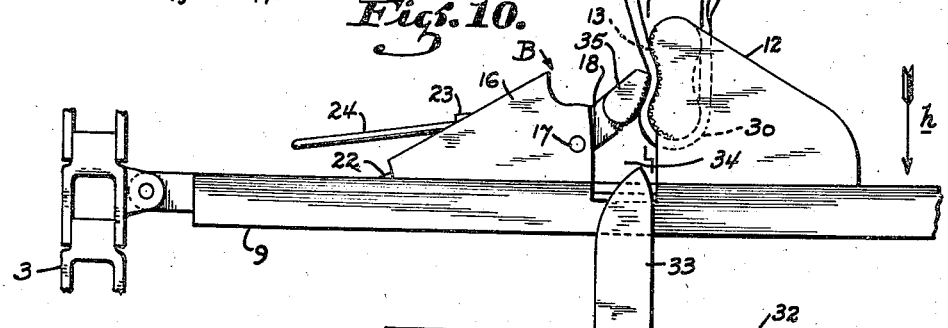
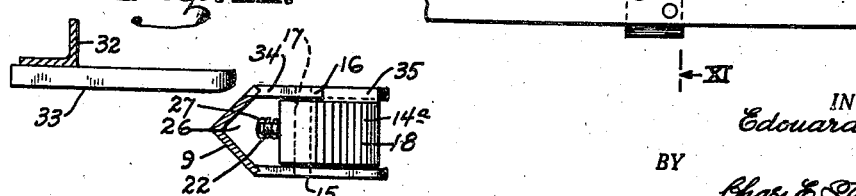
INVENTOR.
Edouard Thys.
BY
Chas. E. Townsend.
ATTORNEY.

Patented Mar. 12, 1940

2,193,354

UNITED STATES PATENT OFFICE 2,193,354

VINE GRASPER BAR

Edouard Thys, Sacramento, Calif., assignor to E. Clemens Horst Company, San Francisco, Calif., a corporation of New Jersey Application September 27, 1938, Serial No. 231,909

3 Claims. (Cl. 130—30)

This invention relates to an apparatus for grasping and holding one end of a hop vine while it is being fed or pulled through a hop picking machine, this application being a continuation in part of the vine grasper structure disclosed in my co-pending application entitled "Hop picking machine," filed June 30, 1937, Serial No. 151,142.

The object of the present invention is generally to simplify and improve the construction and operation of vine grasper bars of the type described; to provide a grasping mechanism which automatically increases its grip on the vine as the pull on the vine increases; and further, to provide a grasping mechanism from which the vine is readily released and removed when the picking operation is completed.

The vine grasper bar is shown by way of illustration in the accompanying drawings, in which:

Fig. 7 is a plan view partially in section of one end of a vine grasper bar, showing the grasping mechanism in open position;

Fig. 8 is a view similar to Fig. 7 showing the grasping mechanism in closed or grasping position;

Fig. 9 is a side view of Fig. 7, looking in the direction of the arrows IX—IX;

Fig. 10 is a bottom view of one end of a grasper bar and the grasping mechanism carried thereby, said view showing the stationary cam whereby the pivoted grasping jaw is automatically opened to release a vine; and Fig. 11 is a cross section taken on line XI—XI of Fig. 10.

Figure 1:
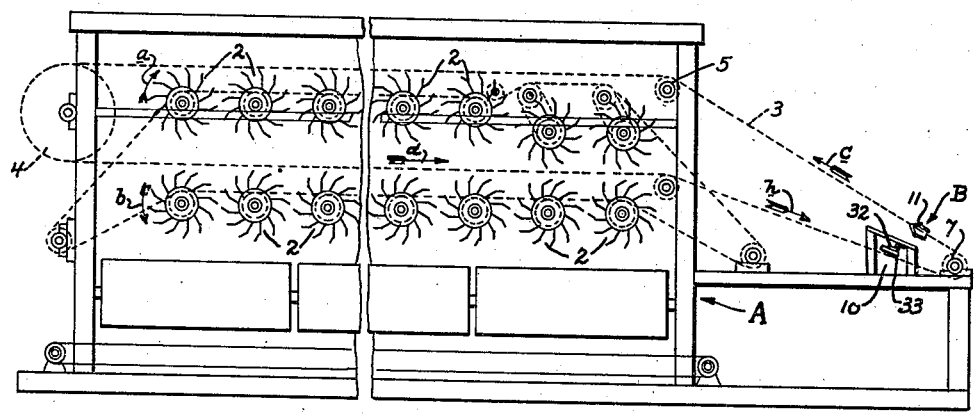
Fig. 1 is a diagrammatic side elevation of a hop picking machine.

Referring to the drawings in detail, and particularly to Fig. 1, A indicates an elongated frame in which are mounted upper and lower rows of picker drums such as indicated at 2. These drums are provided with spaced rows of V-shaped picking fingers constructed of resilient spring wire, and as the upper drums rotate in the direction of arrow $a$, and the lower drums in the direction of arrows $b$, a hop vine when passed between the drums will be combed by the fingers, and the hops will be removed. To accomplish this, a pair of spaced endless sprocket chains 3 are employed. These chains pass over a driving sprocket 4 and idlers such as indicated at 5, 6, and 7. The vine grasper bars shown at 9 are secured at spaced intervals between the sprocket chains 3, and if vines are attached thereto, they will first pull the vines upwardly in the direction of arrows $c$ over the upper row of drums, then pass around the driving sprocket 4, and finally pull the hop vines between the drums in the direction of arrow $d$. Thereafter, the vines are released at the point 10, and new vines to be picked are applied.

A platform, not shown, is disposed in front of the idler sprockets 7. Two operators are stationed on this platform; they grasp the butt or root ends of the hop vines and secure them to the grasper bar indicated by dotted lines at 11, and when secured the vines will take the path through the machine which has previously been described, and when they reach the point 10 they will be automatically released. The mechanism for securing the vines and for releasing them forms the subject matter of the present application, and is best illustrated in Figs. 2 to 11 inclusive.

Figure 2:
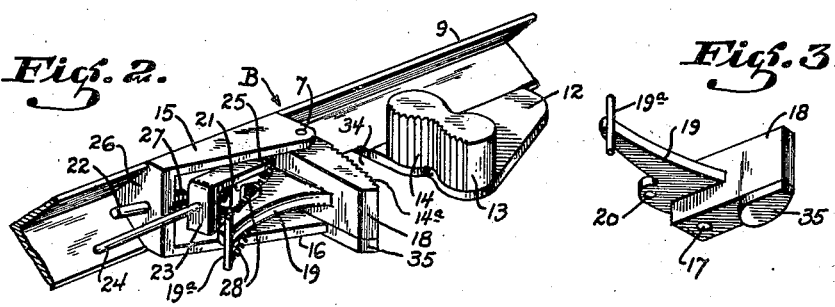
Fig. 2 is a perspective view of the vine grasping mechanism.
Figure 3:
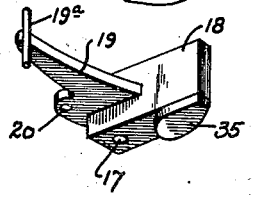
Fig. 3 is a perspective view of the pivoted grasper jaw.
Figures 4, 5:
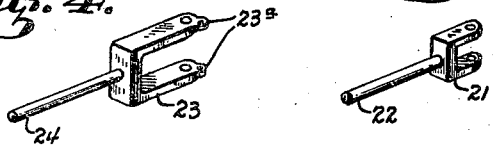
Fig. 4 is a perspective view of the releasing lever.
Fig. 5 is a perspective view of the spring-actuated push rod.
Figure 6:
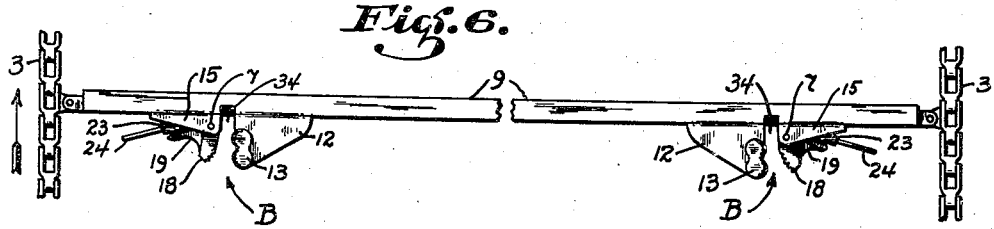
Fig. 6 is a plan view of a complete vine grasper bar.

Each grasper bar is constructed of angle iron (see Fig. 2). At each end thereof is placed a grasping mechanism generally indicated at B. As each grasping mechanism is like all the others, a description of one will suffice. Referring to Figs. 2 to 8 inclusive, 9 indicates the angle bar, and 12 a plate welded or otherwise secured thereto. Supported by the plate is a stationary-gripping jaw 13, and formed on the inner face thereof are serrations or teeth 14. Also welded or similarly secured to the angle bar are a pair of plates 15 and 16, and pivotally mounted as at 17 is a gripping jaw 18, which is also provided with serrations or teeth 14a. Means are provided for automatically opening, or in other words, swinging the pivoted jaw 18 from the closed position shown in Fig. 8 to the open position shown in Fig. 7, and means are also provided for manually closing or swinging the jaw 18 from its open position to the closed or gripping position shown in Fig. 8. This latter means is constructed as follows: Formed on the rear side of the pivoted gripping jaw 18 is an arm 19, and pivoted to said arm at the point 20 is a form 21 which terminates in a rod 22, and also a fork 23 which terminates in a handle 24. A pin 25 extends through the eyes of the forks 23 and 21, and the pivot 20 formed in the arm 19, and the rod 22 extends through an end plate 26 whereby the plates 15 and 16 are connected. The rod is freely slidable in this end plate, and a spring 27 is interposed between said plate and the fork 21. On the fork 23 are formed a pair of lugs 23a, and on the outer end of the arm 19 is a cross-arm 19a. A pair of springs 28 connects the cross-arm 19a with the extensions 23a of the fork; and the function of the gripping mechanism as a whole will be as follows.

If reference is made to Fig. 7, it will be noted that spring 27 will normally function to hold the pivoted jaw 18 in open position, as the pivot pin 25 which connects the fork 21 with the arm 19 of the pivoted jaw is offset with relation to a center line drawn between the pivot point 17 and the hole in the end plate 26 through which the rod extends. Plainly speaking, the connection is an off-center toggle, which is spring-actuated and for that reason normally holds the jaw open. If it is desired to close the jaw, it is only necessary to swing the pivotal point 25 on the opposite side of the imaginary center line drawn between the point 17 and the hole in the plate 26, as the spring will then act to close the jaws. In order to do this, lever 24 is provided. By grasping the lever 24 and swinging it in the direction of the arrow e, the upper end of the fork 23 will engage the cross-arm 19a of the arm 19, and thus swing the jaw about the pivot 17, and the moment it has swung sufficiently far to permit the pivot pin 25 to swing to the other side of the imaginary center line, spring 27 will immediately close or swing the pivoted jaw 18 into contact with the stationary jaw 14. The handle 24 will, during this period, swing from the full line position shown in Fig. 7 to the dotted line position shown in Fig. 8, but when it is released, springs 28 will pull the lever back to the full line position shown in both Figs. 7 and 8, where it is substantially parallel with the angle bar 9 and in a position where it is not affected by the vines or picking fingers of the machine.

In actual operation, it was previously stated that the operator or operators who feed the vines to the machine are stationed on the platform disposed in front of the sprocket 7. The operator, when he is going to apply a vine, grasps it at its butt or root end and forms a loop 30 which he places over the stationary jaw as shown in Fig. 8. He then grasps the lever 24 and swings it to the dotted line position, and thereby closes the jaw 18, and when he releases the lever 24, it automatically swings back to the full line position shown in Figs. 7 and 8, or, practically speaking, into parallelism with the bar 9. When this is done, the vine is secured and will be pulled through the machine as previously described. As it is being pulled through the machine, the pull on the vine increases, particularly when it passes between the upper and lower rows of drums, or in the direction of arrow d (see Fig. 1). Such increased pull will not release the vine or permit it to be pulled from between the jaws, as any increase in pull will simply cause the jaw 18 to swing in the direction of arrow g and thereby increase the pressure and grip on the vine. Thus accidental release due to increased pull or otherwise is not liable to effect release or pulling loose of the vine from the grasping mechanism.

After the vine has completed its circuit through the picking machine it reaches the point 10, which is below but adjacent the feeding position. At this point a cross-bar 32 extends across the machine. On this bar are a pair of cam fingers 33, and these cam fingers align with slots 34 formed between the plates 12 and 16. On the lower face of the pivoted jaw 18 is a lug or plate 35. This extends into the slot 34; hence as the grasper bar is moving in the direction of arrow h (see Figs. 1 and 10) and the cam finger 33 enters the slot 34, it will engage the plate or lug 35 and thereby swing the jaw 18 about its pivot 17 back to open position, and it will there be held in open position until it is again closed by means of the lever 24.

When the grasping mechanism is in the feeding position, the stationary jaw 13 points upwardly and thereby permits the loop formed by the operator or feeder of the vine to be hooked over it, but when the grasper bar is returning, and approaching the bar 32 and cam finger 33, it is turned upside down; hence when the jaw 18 is opened, the loop formed around the stationary jaw 13 will fall off, and the vine is entirely clear and free of the grasping mechanism.

The broad idea of a grasping mechanism of this character is old, as it is fully disclosed in Patent No. 1,054,360, issued to George E. Miller on February 25, 1913. He discloses a hop picking machine of the character here shown; he discloses the use of grasper bars and a grasping mechanism which is manually operated when the vine is hooked on, and which is automatically opened when the vine is picked. This mechanism has been extensively used since the issuance of the patent, and no improvement was made thereon until just recently, when the structure here disclosed was developed and put into use. It has proven superior due to the ease with which the vine is released and removed; and it has also proven superior due to the automatic gripping action of the jaw 18 as the pull on the vine increases.

Structurally, the grasping mechanism here shown differs from that disclosed in the patent to Miller, and in actual operation it is superior due to the advantages just set forth.

Having thus described and illustrated my invention, what I claim and desire to secure by Letters Patent is:

1. A vine grasper mechanism comprising a bar, a stationary jaw on the bar adapted to receive and to be encircled by the looped end of a vine, a pivotally mounted jaw disposed at one side of the stationary jaw and presenting a gripping surface substantially parallel to one side of the stationary jaw when open, and an angular position when swinging about the pivot to a closed or gripping position, so that the grip exerted by the pivoted jaw will increase in proportion to a pull exerted on the vine, a rod pivotally connected to the pivoted jaw, and a spring surrounding the rod, said spring and rod exerting a pressure on the pivoted jaw on one side of the pivot about which the pivoted jaw swings, to retain said jaw in open position, and swinging to the other side of the pivot when said jaw is swung to gripping position, and thereby also retaining said jaw in gripping position.

2. A vine grasper mechanism comprising a bar, a stationary jaw on the bar adapted to receive and to be encircled by the looped end of a vine, a pivotally mounted jaw disposed at one side of the stationary jaw and presenting a gripping surface substantially parallel to one side of the stationary jaw when open, and an angular position when swinging about the pivot to a closed or gripping position, so that the grip exerted by the pivoted jaw will increase in proportion to a pull exerted on the vine, a spring actuated toggle member connected with the pivoted jaw for normally retaining the jaw either in open or closed position, a hand operated lever pivotally mounted adjacent one side of the pivoted jaw, said lever normally assuming a position substantially parallel to the bar but adapted, when grasped, to be swung to a position substantially at right angles to the bar, and during said movement engaging the pivoted jaw and swinging it to gripping position, and means for automatically returning the hand lever when released to normal position.

3. A vine grasper mechanism comprising a bar, a stationary jaw on the bar adapted to receive and to be encircled by the looped end of a vine, a pivotally mounted jaw disposed at one side of the stationary jaw and presenting a gripping surface substantially parallel to one side of the stationary jaw when open, and an angular position when swinging about the pivot to a closed or gripping position, so that the grip exerted by the pivoted jaw will increase in proportion to a pull exerted on the vine, a rod pivotally connected to the pivoted jaw, and a spring surrounding the rod, said spring and rod exerting a pressure on the pivoted jaw on one side of the pivot about which the pivoted jaw swings, to retain said jaw in open position, and swinging to the other side of the pivot when said jaw is swung to gripping position, and thereby also retaining said jaw in gripping position, a handle pivotally mounted on the jaw for swinging the jaw about its pivot toward gripping position, and a spring connected with the handle for swinging it when released to a position substantially parallel to the bar.

EDOUARD THYS.